United States Patent
Plocek

[11] 3,913,525
[45] Oct. 21, 1975

[54] SHRIMP TANK
[76] Inventor: Frank C. Plocek, 213 Orangeburgh Road, Old Tappan, N.J. 07675
[22] Filed: July 7, 1972
[21] Appl. No.: 269,837

[52] U.S. Cl. .................................................. 119/2
[51] Int. Cl.² ......................................... A01K 61/00
[58] Field of Search ....................................... 43/57; 119/2-5; 261/DIG. 14, 31, 30

[56] References Cited
UNITED STATES PATENTS
| | | | |
|---|---|---|---|
| 3,086,497 | 4/1963 | Novello | 119/2 |
| 3,216,395 | 11/1965 | Girard | 119/5 |
| 3,294,239 | 12/1966 | Dayes | 119/5 |
| 3,604,395 | 9/1971 | Huslin | 119/2 |
| 3,638,616 | 2/1972 | Carmouche | 119/5 |

Primary Examiner—Louis G. Mancene
Assistant Examiner—Peter K. Skiff
Attorney, Agent, or Firm—Harold W. Adams

[57] ABSTRACT

A tank for keeping brine shrimp having a sloped bottom and including air injection means for creating circular water currents in said tank and maintaining said shrimp in a moving suspension thereby inducing oxygen into the respiratory systems of said shrimp prolonging the life thereof.

4 Claims, 3 Drawing Figures

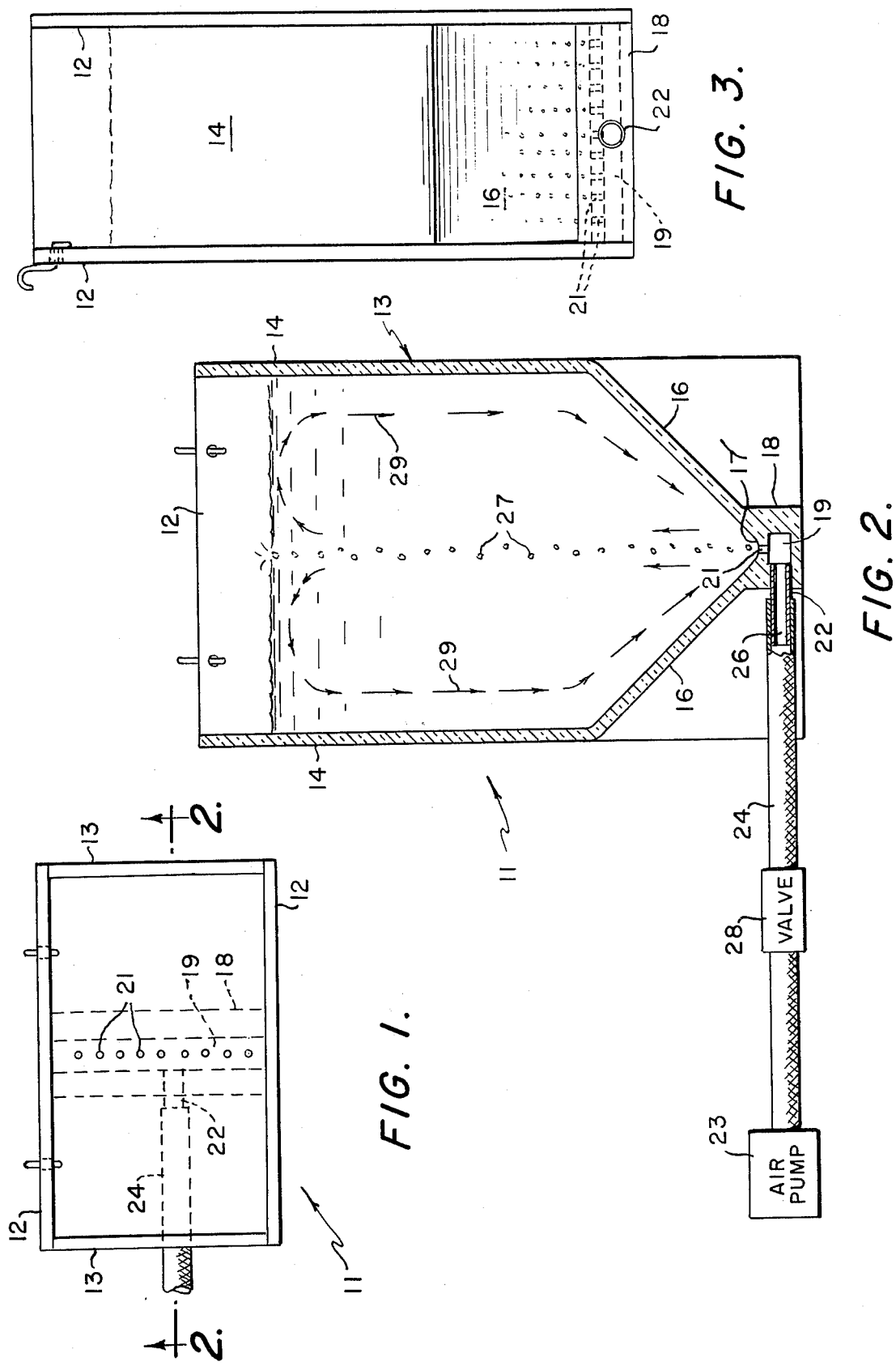

SHRIMP TANK

BACKGROUND OF THE INVENTION

Numerous devices for the incubation and hatching of brine shrimp from eggs are known. For instance, see U.S. Pat. Nos. 2,984,207 to Drake, 2,920,606 to Anderson and 3,086,497 to Novello. Such devices employ means for circulating shrimp eggs and for separating the hatched shrimp from the egg shells, but none, to the investors knowledge, relate to a tank devised specifically for keeping brine shrimp alive over periods longer than possible using shrimp containers now available.

The growing popularity of aquariums has created an increasing demand for live adult brine shrimp as a food diet for tropical and other fish and consequently a need for convenient, economical means for keeping the shrimp live over long periods. Normally, brine shrimp have a short life when stored in a conventional tank due to a lack of motion causing them to pile up and die of suffocation. Applicant has discovered that by keeping the brine shrimp in a moving oxygenated brine solution, such movement not only prevents the shrimp from piling up and suffocating, but assists in inducing oxygen into the respiratory systems of the shrimp, greatly extending the tank storage life of the shrimp.

BRIEF DESCRIPTION OF THE INVENTION

Accordingly, an object of this invention is to provide a tank for keeping live adult brine shrimp wherein the shrimp are maintained in a continuous moving suspension throughout the tank in an oxygenated brine solution.

Another objection of the invention is to provide a single tank of a variable brine solution and therefore brine shrimp storage capacity.

BRIEF DESCRIPTION OF THE DRAWING

Many other objects and advantages of the invention will become apparent from the following detailed description of a preferred embodiment of the invention when read in view of the appended drawing wherein:

FIG. 1 — is a plan view of a preferred embodiment in accordance with the principles of the invention;

FIG. 2 — is a cross-sectional view along lines 2—2 of FIG. 1 and;

FIG. 3 — is an end view of the invention.

DETAILED DESCRIPTION OF INVENTION

Referring to the drawing a preferred embodiment of the invention is shown as comprising an open, ractangular tank 11 formed of parallel side walls 12 and side wall 13, the upper portions 14 of which are parallel and the lower portions 16 of which extend inwardly at a preferred angle of 45° where they join in a gentle curve at the tank mid-line forming a slightly curved trough 17 extending across and near the base of the tank 11.

The engaging surfaces of side walls 12 and 13 are secured together by adhesive or other means to provide a sealed brine storage tank 11. The tank 11 may be constructed of a clear plastic material and may be integrally formed by molding if preferred, in a square, rectangular or other configuration of any volume and shrimp storage capacity. Cross member 18, also formed of clear plastic and provided with an internal longitudinal bore or plenum chamber 19, extends between side walls 12 and is sealingly attached to the lower surface of the trough 17.

Spaced passages 21 interconnect the inside of the tank 11 and the plenum chamber 17. Sleeve 22 is connected to a continuous source of air pressure such as pump 23 by means of a flexible tubing 24 through passage 26 that opens into chamber 17. The minimum air pressure in the plenum chamber 17 is greater than the pressure of the brine solution in tank 11 so the air under pressure from pump 23 escapes through passages 21 and rises as bubbles to the surface of the brine solution in spaced, parallel streams 27.

Valve 28 permits selective variation of air flow into chamber 19 and thus control of the current and shrimp within the tank 11. The parallel streams of air bubbles cooperate to create an upward current in the brine solution, which because the air flow is constant, divides at the surface and establishes return currents that move downwardly along the side walls and sloped bottom to the air source, creating two circular currents as shown by arrows 29 in FIG. 1.

The parallel streams of air bubbles assure a constant supply of oxygen in the brine solution and the continuous circular currents created thereby maintain the adult brine shrimp in the tank in a moving suspension throughout tank 11. This continuous movement assists in forcing oxygen bearing brine solution into the respiratory systems of the shrimp.

In addition to simulating the swimming motion of the shrimp and inducing oxygen into their respiratory systems, the circular movement prevents the shrimp from piling up and suffocating.

The sloped bottom of the tank prevents pile-up of shrimp within the tank by eliminating dead spots, areas without current movement, and also directs the return of the circular currents to the passages 21 and thus the air source. With the bottom of the tank sloped, the level of brine solution and thus volume of solution and quantity of shrimp stored in a given tank may be varied without danger of shrimp pile-up and suffocation. The tank bottom is preferably sloped from opposing side walls to the tank mid-line to provide twin circular currents in the solution.

However, the tank may also be sloped at one angle from one side wide wall to the opposing side wall. In this construction the plenum chamber is positioned so the streams of air bubbles rise along the opposing side wall creating one circular current in the brine solution.

As previously stated, the tank may be rectangular, cylindrical or of other configuration with the air source positioned at the mid-line of the tank or along an opposing side wall. Sidewalls 13 may be provided with holes 29 for receiving the tank hooks or hangers 31 for maintaining on an aquarium or other object.

Although a preferred embodiment of the invention has been described in detail, numerous changes and modifications can be made within the principles of the invention which is limited only by the scope of the appended claims.

What is claimed is:

1. A rectangular tank for the live storage of brine shrimp comprising:
    a. A tank for brine solution, the bottom of said tank being sloped from opposing sidewalls to a midline of the base of said tank;
    b. A plenum chamber in the base of said tank separated from the interior thereof by said sloped bottom;

c. a plurality of passages spaced across the width of said tank on said midline thereof;
d. Means connecting said plenum chamber to a continuous source of air pressure, said air passing into said plenum chamber escaping into said passages into said tank inducing a circular water current, maintaining said shrimp in said brine solution in a moving suspension.

2. A tank as defined in claim 1 formed of a clear plastic material.

3. A tank as defined in claim 1 including support holes therein.

4. A tank as defined in claim 1 including mounting means attached thereto.

* * * * *